(12) United States Patent
Dexter

(10) Patent No.: US 10,807,539 B2
(45) Date of Patent: Oct. 20, 2020

(54) VEHICLE TUNNEL-HUMP ORGANIZER FOR UNDERSEAT STORAGE

(71) Applicant: Tim Dexter, Orland, CA (US)

(72) Inventor: Tim Dexter, Orland, CA (US)

( * ) Notice: Subject to any disclaimer, the term of this patent is extended or adjusted under 35 U.S.C. 154(b) by 85 days.

(21) Appl. No.: 16/186,736

(22) Filed: Nov. 12, 2018

(65) Prior Publication Data

US 2019/0168677 A1 Jun. 6, 2019

Related U.S. Application Data

(60) Provisional application No. 62/708,122, filed on Dec. 4, 2017.

(51) Int. Cl.
| | |
|---|---|
| *B60R 7/04* | (2006.01) |
| *B60N 3/10* | (2006.01) |
| *B60N 3/08* | (2006.01) |

(52) U.S. Cl.
CPC ............... *B60R 7/043* (2013.01); *B60N 3/08* (2013.01); *B60N 3/10* (2013.01)

(58) Field of Classification Search
CPC .............. B60R 7/043; B60N 3/08; B60N 3/10
See application file for complete search history.

(56) References Cited

U.S. PATENT DOCUMENTS

| | | | | |
|---|---|---|---|---|
| 3,278,008 A | * | 10/1966 | Larkin ................. | B60N 3/08 224/540 |
| 2017/0291733 A1 | * | 10/2017 | Henderson ......... | B65D 11/1833 |

* cited by examiner

*Primary Examiner* — D Glenn Dayoan
*Assistant Examiner* — Melissa A Black
(74) *Attorney, Agent, or Firm* — R. Lynette Wylie; Apex Juris, pllc.

(57) ABSTRACT

A vehicle organizer capable of underseat storage when mounted upon a tunnel-hump, including a flexible receiving member having an elongate base portion and perpendicularly disposed opposing sidewalls extending upwardly from the elongate base portion, wherein the open enclosure is configured for underseat storage while the flexible receiving member is mounted atop the tunnel-hump, a pair of flaps extending from the axial plane of the flat common bottom plane, wherein the pair of flaps have opposing weighted ends for stable mounting upon the tunnel-hump, and a receptacle having a planar bottom and sidewalls configured for removable seating within the second open enclosure whereby the receptacle is prevented from tipping, and wherein the vehicle organizer is configured for the underseat storage when the receiving member is mounted atop the tunnel-hump.

16 Claims, 5 Drawing Sheets

VEHICLE TUNNEL-HUMP ORGANIZER FOR UNDERSEAT STORAGE

CROSS-REFERENCE TO RELATED APPLICATIONS

This Application claims priority to and benefit under 35 USC § 119(e) of U.S. Provisional Patent Application Ser. No. 62/708,122 having a filing date of Dec. 4, 2017, which is hereby incorporated by reference herein.

FIELD OF THE INVENTION

The present invention relates to the field of vehicle organizers and storage units, particularly compartmentalized units mounted atop a vehicle tunnel-hump.

BACKGROUND OF THE INVENTION

Organizers, drinkholders and storage units for vehicle interiors are well known and include trays with weights for staying put on a vehicle tunnel-hump. Such prior art organizers provide ready access to the items stored or held for the convenience of the vehicle occupants. To that end, known vehicle organizers, particularly those adaptable to tunnel-hump mounts accessible to the front seat most commonly occupied while the vehicle is in transit have been designed to serve a primary objective of providing convenient, ready and open access to items being goods being used or consumed.

As a point of reference, a typical prior art automotive organizer tray is shown and described in U.S. Pat. No. 3,804,233 drawn toward a rigid tray for placement on either the tunnel-hump of seat with molded wells for holding articles for the convenient access to the driver or a passenger of the vehicle. Although such conventional storage and serving holders served the advantages of convenient access, substantial drawbacks and disadvantages with prior art devices nonetheless persist. In particular disadvantage relates to the rigid and obtrusive shape of such typically molded trays which clutter the vehicle interior, obstruct access to vehicluar controls, are unsightly and are not storable within the vehicle interior. The obtrusive design of prior art vehicle organizers are particularly problematic in the context of the streamlined and constricted space of increasing smaller fuel efficient, compact and subcompact vehicles, especially with regard to tunnel-hump mounted organizers that may obstruct or be tipped during typical and often frequent exchanges and interactions between the driver and front seat passenger of a vehicle. Moreover, conventional organizers typically lack provision for trash container storage during vehicle transit and hence do not remediate the persisting problem with unsecured or mounted trash bags which are unsightly and prone to being spilled of smashed. Moreover, being obstructed or reaching over to retrieve a spilled and tipped edible or drink in a conventional tunnel-hump organizer could give rise potential distractions that could deter focus of the driver and increase the risk of an accident.

Hence, up to now, problems with tunnel-hump organizers and storage units for consumables, refuse and items which vehicle occupants seek to readily access while a vehicle is in transit persist. Thus, there is a persisting need for an organizer addressing such drawbacks and disadvantages and provide accessible yet neat and unobtrusive yet accesssible storage for items such as trash receptacles and consumables while a vehicle is in transit.

SUMMARY OF THE INVENTION

Addressing such and other advantages of the prior art, the present invention provides a vehicle organizer capable of underseat storage when mounted upon a tunnel-hump, including a flexible receiving member having an elongate base portion and perpendicularly disposed opposing sidewalls extending upwardly from the elongate base portion, wherein the open enclosure is configured for underseat storage while the flexible receiving member is mounted atop the tunnel-hump, a pair of flaps extending from the axial plane of the flat common bottom plane, wherein the pair of flaps have opposing weighted ends for stable mounting upon the tunnel-hump, and a receptacle having a planar bottom and sidewalls configured for removable seating within the second open enclosure whereby the receptacle is prevented from tipping, and wherein the vehicle organizer is configured for the underseat storage when the receiving member is mounted atop the tunnel-hump.

The receiving member has an elongate base portion and a pair of opposing flaps extending in an outward angle from the elongate base portion with weighted ends for stable mounting upon the tunnel-hump. A key feature of the vehicle organizer according to the present invention is its configuration for underseat storage when the receiving member is mounted atop the tunnel-hump. In preferred embodiments of the present invention, the receiving member is composed of a flexible material and may incorporate a live hinge within the sidewalls facilitating adaptive stowability is constricted spaces such as beneath and about an automobile seat.

A particularly preferred embodiment of the present invention includes rigid planar members inserted between the two coextensive layers of opposing sidewalls, wherein the rigid planar members are configured to form live hinges whereby sidewalls foldable toward the elongate base portion.

The present invention includes a receptacle configured for fitted seating within the open enclosure such that the sidewalls of the open enclosure keep the receptacle upright. The receptacle is adaptable to various uses, and is particularly useful for trash disposal.

Further embodiments may include a plurality of open enclosures with the flat bottoms of the plurality of open enclosures aligned along a longitudinal axis in a substantially perpendicular orientation from the substantially longitudinal direction of the pair of opposing flaps. In a particularly preferred embodiments, the receiving member includes a first open enclosure and a second open enclosure aligned along a common axial plane having a longitudinal axis in a substantially perpendicular orientation from the substantially longitudinal direction of the pair of flaps, wherein the first open enclosure is configured for stowed storage beneath the automobile seat and the second enclosure is oriented in a forward direction toward the pair of flaps in front of the seat above and holds a corresponding receptacle removably seated in the second enclosure to keep the receptacle upright.

The receiving member is a flexible material and the at least one open enclosure includes a first open enclosure and a second open enclosure aligned along a common axial plane having a longitudinal axis in a substantially perpendicular orientation from the substantially longitudinal direction of the pair of flaps.

An alternative embodiment of the present invention also includes a lid that may extend from a portion of the sidewall of the second open enclosure configured for detachable engagement about a top periphery of the receptacle. Preferred embodiments may further include a non-skid or gripping material which may be a rubber of a high coefficient of friction or may alternatively include a hook and loop material for fastening the receiving member to corresponding hook and loop material on the surface of the tunnel-hump.

A yet further feature of alternative embodiments of the present invention includes one or more pockets attached to an outward facing portion of the sidewall of the at least one open enclosure. Additional pockets or compartments may be attached to store and organize additional items. A yet further feature of the present invention is a cylindrical opening disposed on the flat bottom, wherein the cylindrical opening is configured for holding a cup upright.

The terms "with," "having," "has," "including," or "includes" are not mutually exclusive and are intended to have the same meaning as terms such as "comprising" or "comprises" and, as such, does not exclude alternative and additional structural components and functionalities.

The foregoing summarizes only a few aspects of the invention and is not intended to be reflective of the full or exhaustive scope of the invention as claimed. Additional features and advantages of the invention are set forth in the following description and may be apparent from the description or made obvious by practicing the invention. Moreover, both the foregoing summary and following detailed description are provided to provide explanatory examples and are not contemplated as limitations of the claims to the present invention.

BRIEF DESCRIPTION OF THE DRAWINGS

The accompanying drawings, which are incorporated in and constitute a part of this specification, illustrate embodiments of the invention and, together with the description, serve to explain the principles of the invention; and, furthermore, are not intended in any manner to limit the scope of the invention.

DETAILED DESCRIPTION OF THE PREFERRED EMBODIMENT

Figure 1:
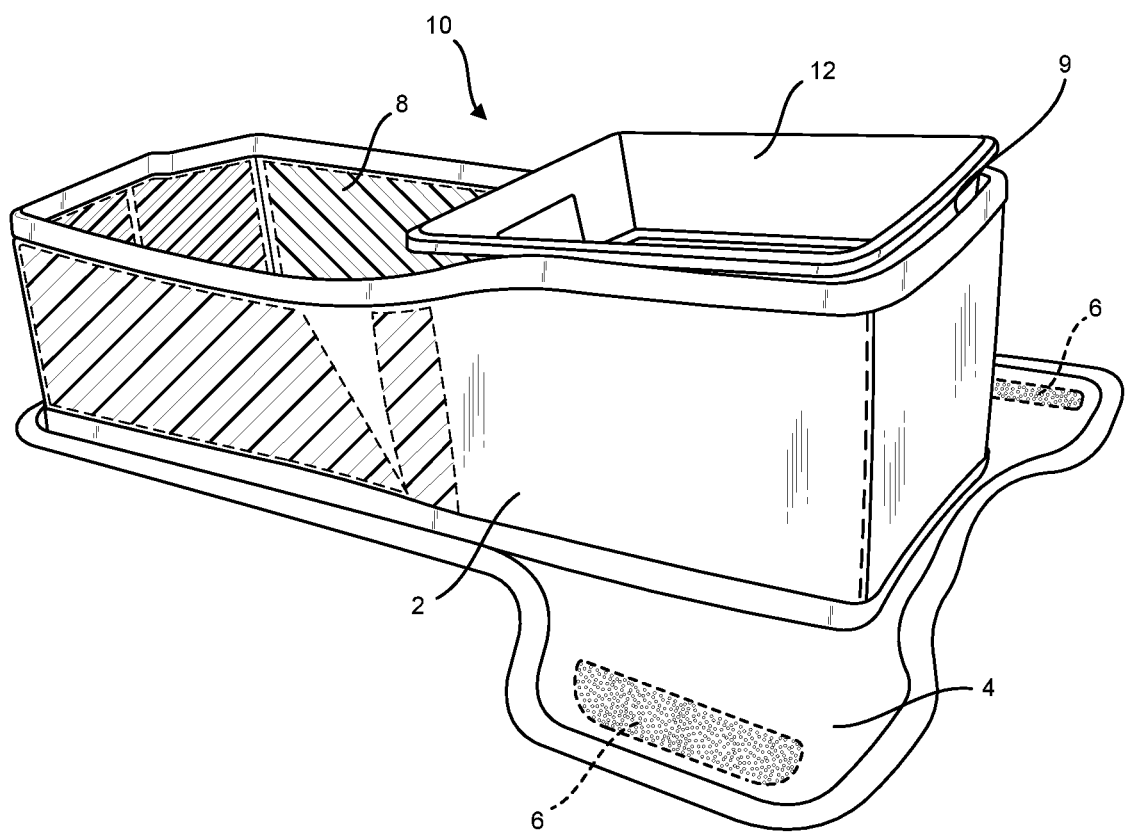
FIG. 1 is a side perspective view of the vehicle organizer of the present invention.
Figure 2:
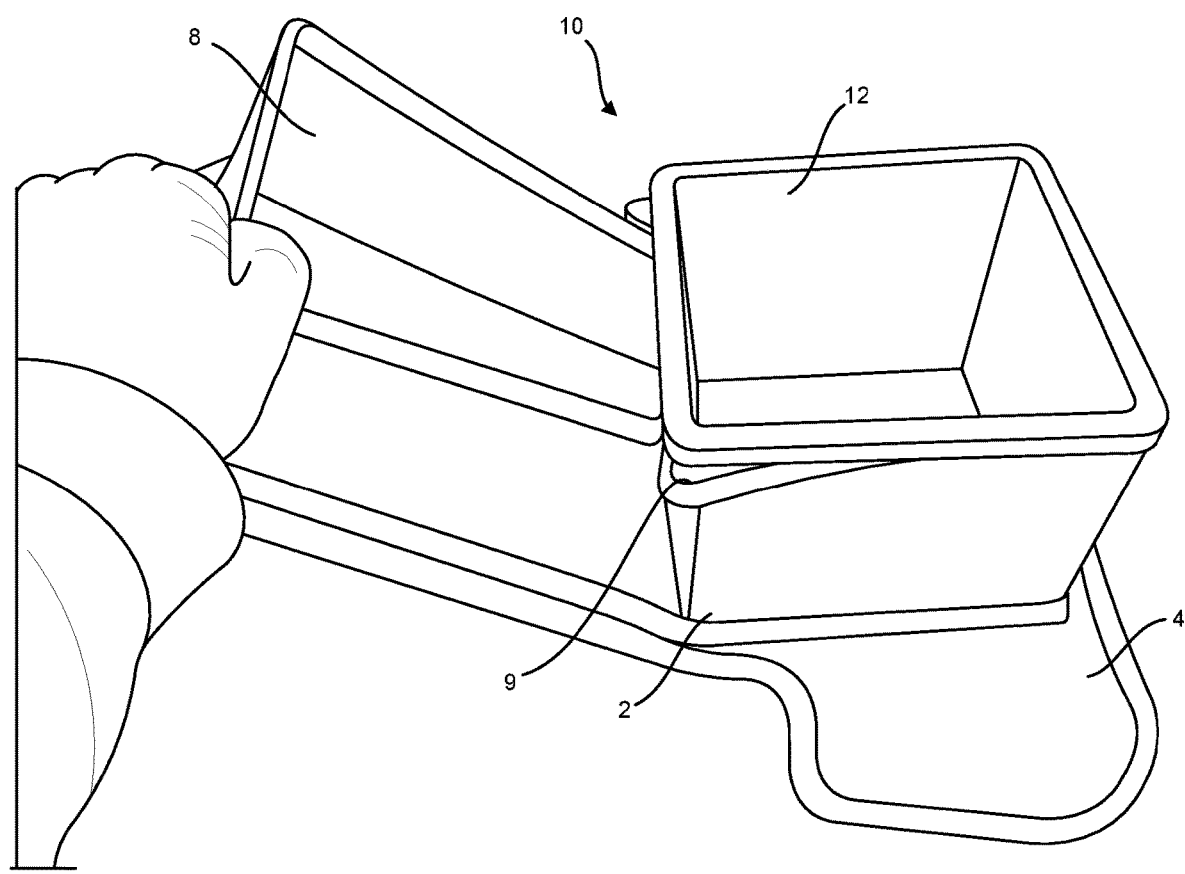
FIG. 2 is another perspective view of the vehicle organizer of the present invention.
Figure 3:
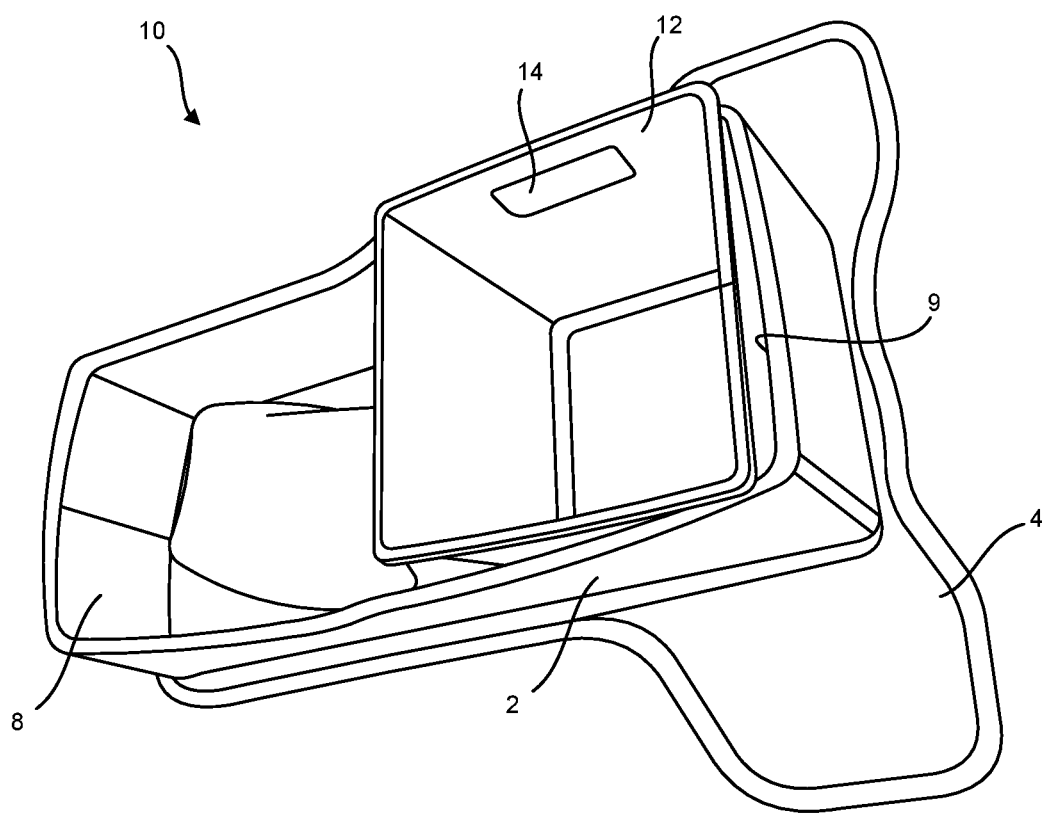
FIG. 3 is a top perspective view of the vehicle organizer of the present invention.
Figure 4:
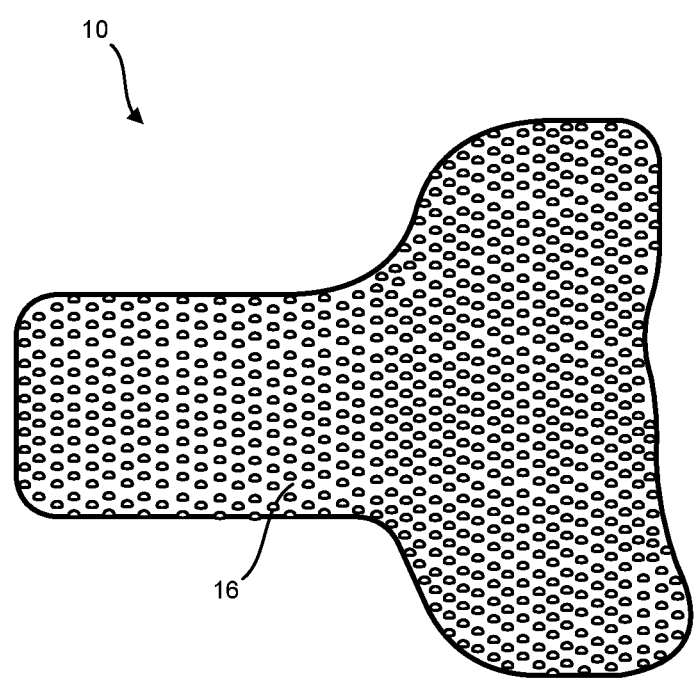
FIG. 4 is a bottom view of non-skid material on the underside of the vehicle organizer of the present invention.

The present invention will now be described more fully hereinafter with reference to the accompanying drawings FIGS. 1-5 illustrating a particularly preferred embodiment of the present invention.

As shown in the exemplary drawings of the present invention, the vehicle organizer 10 capable of underseat storage when mounted upon a tunnel-hump includes a receiving member 2 with an elongate base portion having a first open enclosure 8 and a second open enclosure 9 with sidewalls disposed on an elongate base portion such that the open enclosure is capable of underseat storage when the elongate base portion is mounted upon the tunnel-hump; and a pair of opposing flaps 4 extending at a substantially perpendicular angle from the longitudinal axis of the elongate base portion portion wherein the opposing flaps 4 have weighted ends 6 depicted in phantom lines for stable mounting upon the tunnel-hump, and wherein at least a portion of the collapsible automotive organizer is configured for the underseat storage when the receiving member is mounted atop the tunnel-hump. In alternative embodiments, the sidewalls may be various shapes and sizes adapted to a particular use or space. For example, the sidewalls may be curved and even circular in order to receive and keep upright a circular bin or drink container.

The present invention may be fabricated from various materials capable of providing the illustrated and described functionalities. Preferred embodiments are constructed from durable, flexible and moisture resistant materials such as, for example and without limitation, thermoplastic polyurethane (TPU) or other suitable polymeric or nylon having an elastomer (TPE) or polyurethane coating to enhance desired properties. It is understood that the aforementioned materials are exemplary illustrations of appropriate materials for fabrication of the receiving member and that other materials providing desired features may be used to construct the receiving member 2 according to the present invention that will provide similar functionalities and advantages. Although dimensions of alternative embodiments may vary to accommodate a particular vehicle interior or particular use, in preferred embodiments the elongate base of receiving member 2 measures about 19 inches in length and flaps 4 extend about 6 inches from the periphery of the elongate base dimensions of the open enclosure 8 is 10 L×10 W×4 D inches and of open enclosure 9 is 7½ L×7½ W×4 D inches. In alternative embodiments, the dimensions can vary in accordance with the space constrictions of a particular vehicle interior.

As shown in the shaded portion between the phantom lines of FIG. 1, the illustrated embodiment includes rigid planar members inserted between the two coextensive layers of opposing sidewalls, wherein the rigid planar members are configured and spaced apart to form live hinges shown in the gaps between the shaded areas whereby sidewalls are foldable toward the elongate base portion. The rigid planar members may be comprised of any material capable of being configured in a sheer and rigid composition to provide a upright wall and are preferably composed of a molded plastic.

Opposing weighted ends 6 can also be composed of a variety of materials of sufficient weight for stable mounting of receiving member 2. Such weighted materials may include, for example, planar blocks or balls of metals or metal alloys, or a heavy sand or aggregate In the illustrated embodiment, weighted ends 6 are composed of a packet of steel pellets inserted between the two coextensive layers of the opposed flaps 4. Various joining and insertion methods know in the industry of automotive accessory design may be employed to affix such weighted materials capable of keeping receiving member 2 mounted stably on a vehicle tunnel hump may affixed to opposing ends of flaps 4.

The illustrated embodiment includes a receptacle 12 with a planar bottom and sidewalls and extruded handle 14. Receptacle 12 is configured for removable seating within the open enclosure such that the sidewalls of the open enclosure keep the receptacle upright. Receptacle 12 may be constructed of virtually any rigid material including, for example, a durable plastic polymer such as polystyrene, polyurethane. Alternative materials of the utility board include fiberglass, wood, cellulose and other natural fibers, vermiculite and perlite, or other molded polymer. In yet further preferred embodiments, receptacle 12 may be a stainless steel, metal alloy or carbon fiber.

In particularly preferred embodiments, the vehicle organizer 10 components including open enclosures 2 and 8, flaps 4 and pockets 22 are fabricated employing radio frequency (RF) welding. Now referring to FIG. 4, yet another feature of the illustrated embodiment of the present invention is non-skid material 16 which is preferably protrusions of a rubber material with a high coefficient of friction for gripping the adjoined surface of the tunnel-hump top. According to the present invention, the non-skid material may comprise any uneven or knobbed surface fabricated within or atop any portion including the entire lower surface of receiving member 10. In alternative embodiments of the present invention, non-skid material 24 on a portion of the lower surface of receiving member 10 may include hooked or looped material for engaging corresponding hooks or loops on a portion of the top tunnel-hump surface with which it comes into contact.

Figure 5:
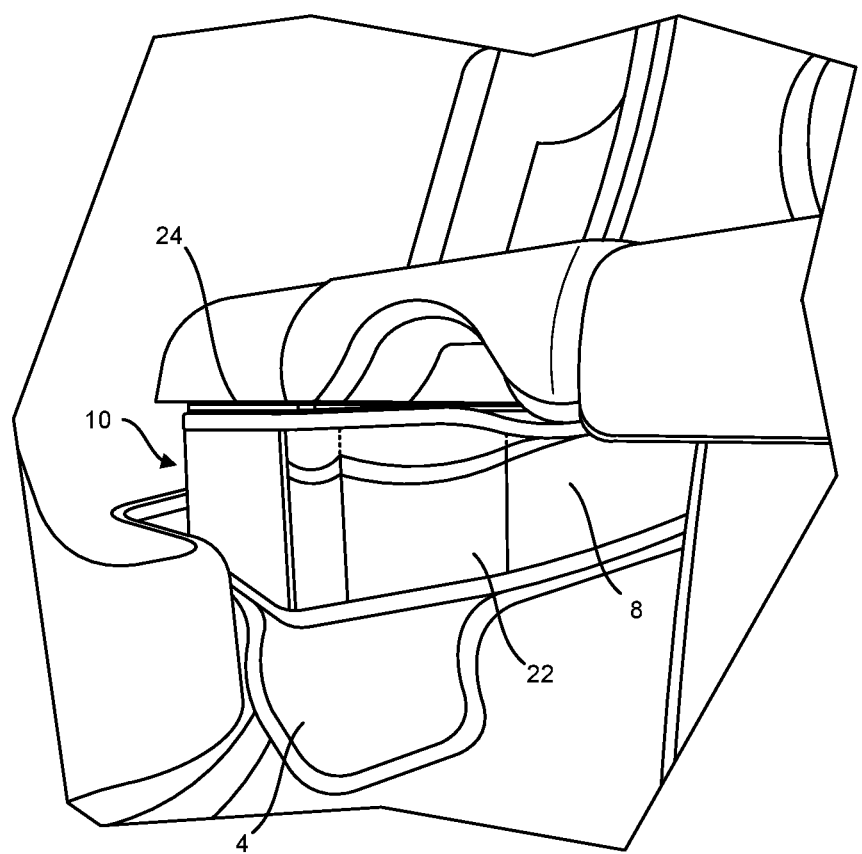
FIG. 5 is a side perspective view of the vehicle organizer of the present invention with a lid mounted in a vehicle.

Now referring to FIG. 5, a yet further feature of the illustrated embodiment of vehicle organizer 10 further is a lid 24 which is shown in closed engagement about a top periphery receptacle 12. In alternative embodiments, the lid may be attached to or extend from receptacle 12.

A yet further feature of the illustrated preferred embodiment includes pocket 22 attached to an outward facing portion of the sidewall of the open enclosure 8. Pocket 22 may be of various sizes, including length, width and depth, in order to adapt to receiving and storing miscellaneous items in accordance with the particular activities and preferences of the vehicle occupants.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A vehicle organizer capable of underseat storage when mounted upon a tunnel-hump, comprising:
   a receiving member having at least one open enclosure with sidewalls disposed upon an elongate base portion such that the open enclosure is capable of underseat storage when the elongate base portion is mounted upon the tunnel-hump and a pair of opposing flaps extending at a substantially perpendicular angle from a substantially longitudinal plane of the elongate base portion wherein the receiving member is a flexible material, and wherein the opposing flaps have weighted ends for stable mounting upon the tunnel-hump, and wherein at least a portion of the collapsible automotive organizer is configured for the underseat storage when the receiving member is mounted upon the tunnel-hump, and wherein the flexible material comprises two coextensive layers and the opposing weighted ends comprise one or more metal members inserted between the two coextensive layers of the opposed flaps, and having at least a pair of rigid planar members inserted between the two coextensive layers of opposing sidewalls, wherein the rigid planar members are configured to form live hinges whereby sidewalls are foldable toward the elongate base portion.

2. The vehicle organizer of claim 1, wherein a lower surface of the elongate base portion has a non-skid material for gripping the tunnel-hump surface to keep the receiving member in a mounted position.

3. The vehicle organizer of claim 1, further comprising:
   a receptacle configured for removable seating within the open enclosure such that the sidewalls of the open enclosure keep the receptacle upright.

4. The vehicle organizer of claim 3, wherein the at least one open enclosure includes a plurality of open enclosures with the flat bottoms of the plurality of open enclosures aligned along the substantially longitudinal axis of the elongate base member in a substantially perpendicular orientation to the opposing flaps.

5. The vehicle organizer of claim 1, wherein the at least one open enclosure includes a first open enclosure and a second open enclosure aligned along a substantially longitudinal plane of the elongate base portion, wherein the first open enclosure is configured for underseat storage and the second enclosure is oriented in a forward direction toward the opposing flaps; and further comprising a receptacle having a planar bottom and sidewalls configured for removable seating such that the sidewalls of the second open enclosure keep the receptacle upright.

6. The vehicle organizer of claim 5, further comprising a lid configured for detachable engagement about a top periphery the receptacle.

7. The automotive organizer of claim 5, further comprising at least one pocket attached to an outward facing portion of the sidewall of the open enclosure.

8. A vehicle organizer capable of underseat storage when mounted upon a tunnel-hump, comprising:
   a flexible receiving member including
      an elongate base portion configured for mounting upon the tunnel-hump,
      at least one open enclosure disposed upon the elongate flat base member, wherein the open enclosure is defined within opposing upwardly extending sidewalls,
      a pair of opposing flaps extending from a longitudinal plane of the elongate base portion, wherein the opposing flaps include weights oriented proximate to opposing ends for stable mounting upon the tunnel-hump,
      wherein the flexible receiving member is configured for underseat storage while mounted upon the tunnel-hump; and further comprising at least a pair of rigid planar members inserted between the two coextensive layers of opposing sidewalls, wherein the rigid planar members are configured to form live hinges whereby sidewalls foldable toward the elongate base portion; and
   a receptacle having a planar bottom and sidewalls configured for removable seating within the open enclosure such that the opposing sidewalls keep the receptacle upright.

9. The vehicle organizer of claim 8, wherein the flexible receiving member comprises two coextensive layers and the weights comprise steel pellets inserted between the two coextensive layers of the opposing flaps.

10. The vehicle organizer of claim 8, wherein a lower surface of the elongate base portion has non-skid protrusions for gripping the tunnel-hump surface to keep the receiving member in a mounted position.

11. The vehicle organizer of claim 8, wherein the at least one open enclosure includes a first open enclosure and a second open enclosure aligned along the longitudinal axis of the elongate flat base portion, wherein the first open enclosure is configured for underseat storage and the second enclosure is spaced in a forward direction toward the pair of flaps; and wherein the receptacle is seated in the second open enclosure such that the sidewalls of the second open enclosure keep the receptacle upright.

12. The vehicle organizer of claim 8, further comprising a lid configured for detachable engagement about a top periphery the receptacle.

13. A vehicle organizer capable of underseat storage when mounted upon a tunnel-hump, comprising:
   a flexible receiving member including an elongate base portion configured for mounting upon the tunnel-hump, wherein a lower surface of the elongate base portion has a gripping material for keeping the receiving member in a mounted position, wherein the flexible receiving member comprises two coextensive layers and further comprising at least a pair of rigid planar members inserted between the two coextensive layers of opposing sidewalls, wherein the rigid planar members are configured to form live hinges whereby sidewalls foldable toward the elongate base portion;
   at least one open enclosure disposed upon the elongate flat base portion, wherein the open enclosure is defined within opposing upwardly extending sidewalls.

14. The vehicle organizer of claim 13, further comprising a pair of opposing flaps extending from transverse side edges of the receiving member wherein the at least one open enclosure includes a first open enclosure and a second open enclosure aligned along the longitudinal axis of the elongate base portion, and wherein the first open enclosure is configured for underseat storage and the second enclosure is spaced in a forward direction toward the pair of opposing flaps and further comprising a receptacle having a planar bottom and sidewalls configured for removable seating within the the second open enclosure such that the sidewalls of the second open enclosure keep the receptacle upright.

15. The vehicle organizer of claim 13, wherein the gripping material comprises hook and loop material for fastening the receiving member to corresponding hook and loop material on the surface of the tunnel-hump.

16. The vehicle organizer of claim 13, further comprising weights inserted between the two coextensive layers proximate to opposing ends of the opposing flaps for stable mounting upon the tunnel-hump.

* * * * *